May 4, 1965 J. M. GEIST ETAL 3,181,306
ARGON SEPARATION
Filed Jan. 11, 1961 2 Sheets-Sheet 1
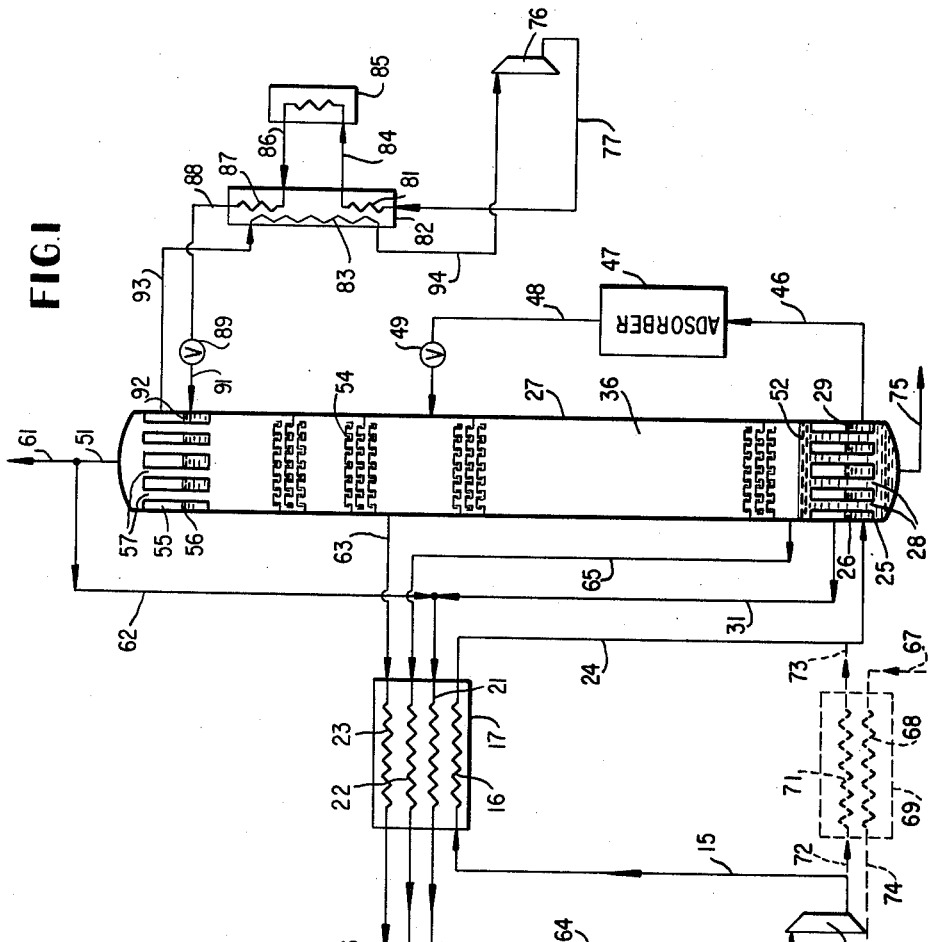
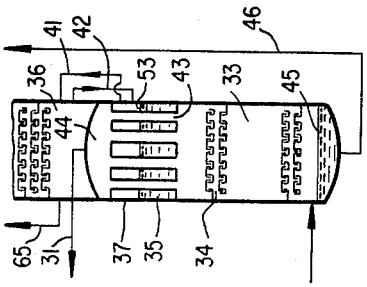
INVENTORS
JACOB M. GEIST
LILBURN CARROLL CLAITOR
JOE L. COST
BY
SHANLEY AND O'NEIL
ATTORNEYS

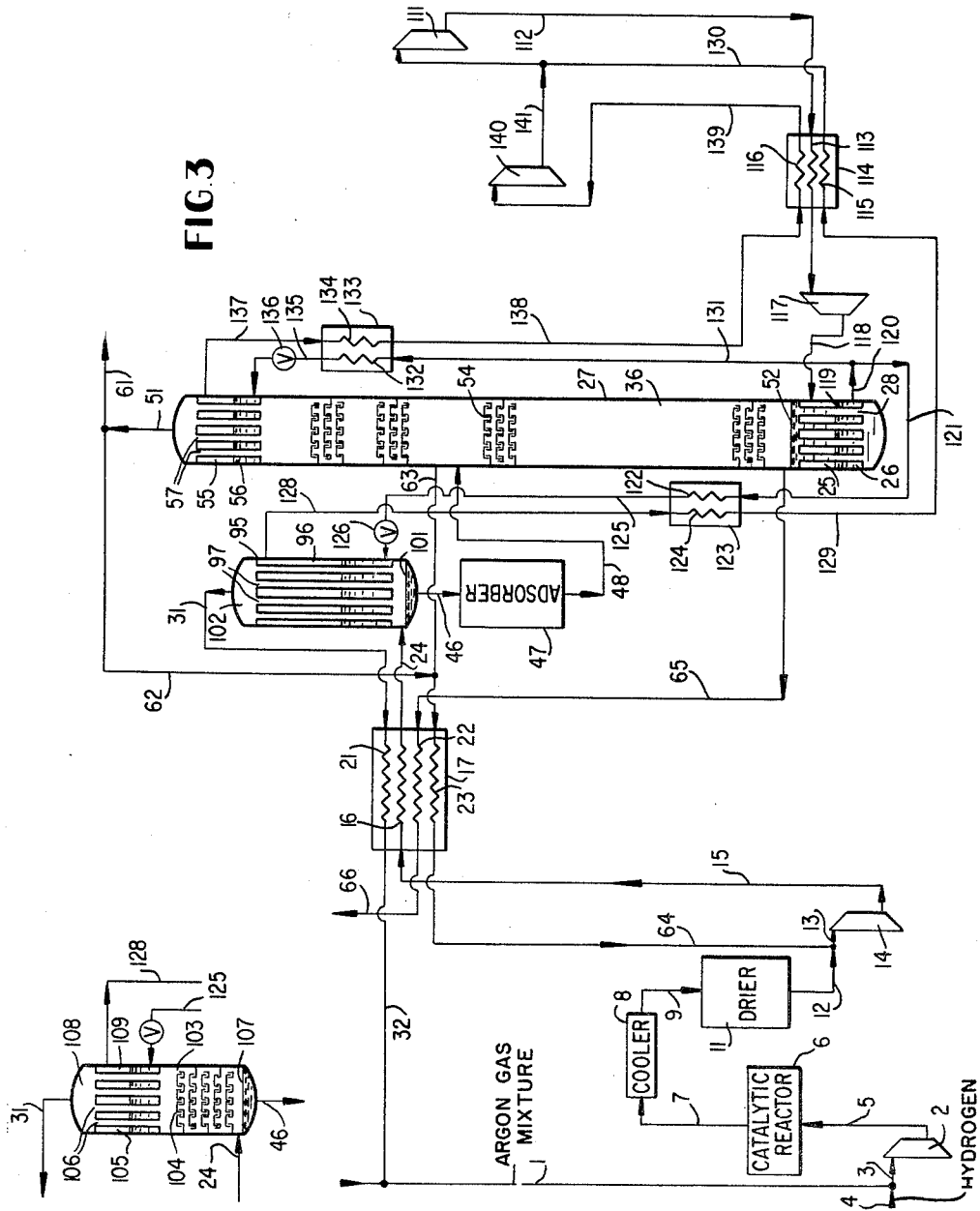

United States Patent Office 3,181,306
Patented May 4, 1965

3,181,306
ARGON SEPARATION
Jacob M. Geist, Lilburn Carroll Claitor, and Joe L. Cost, Allentown, Pa., assignors, by mesne assignments, to Air Products and Chemicals, Inc., Trexlertown, Pa., a corporation of Delaware
Filed Jan. 11, 1961, Ser. No. 82,002
5 Claims. (Cl. 62—22)

This invention relates to the separation of gaseous mixtures and more particularly to the separation of argon containing gaseous mixtures by a process including low temperature fractionation to produce high purity argon.

A source of crude argon may be obtained from a side column associated with the fractionating column of a low temperature air separation plant. The argon product obtained from the side column includes substantial quantities of oxygen and nitrogen and processes have been provided in the past for removing substantial percentages of the oxygen and nitrogen and provide argon of fairly good purity. However, argon obtainable by the prior processes is not of sufficiently high purity required for certain applications such as a shielding gas in inert gas welding techniques where argon substantially devoid of nitrogen is required and the use of argon as an atmosphere for metallurgical processes in which the argon is required to be free of oxygen as well as other impurities such as argon having a maximum impurity content of no more than 50 p.p.m. The use of argon as an atmosphere for metallurgical processes not only presents the problem of providing argon of the required high purity but also the problem of maintaining the atmosphere within the required limits throughout the metallurgical process. Thus, it is necessary to continuously treat the atmosphere to remove impurities such as air which seeps into the chamber containing the atmosphere and impurities entering the atmosphere due to the metallurgical process, and an efficient process for obtaining such purification is essential to the economical feasibility of using inert atmosphere and metallurgical processes.

It is therefore an object of the present invention to provide a novel process for producing high purity argon.

Another object is to provide a novel method of separating gaseous mixtures including a low temperature operation to produce argon having a maximum impurity content no greater than 50 p.p.m.

Still another object of the present invention is to provide a novel method of separating gaseous mixtures including a low temperature process for producing high purity argon in which the recovery of argon is high and the power requirements for the operation are low as compared to prior processes.

With reference more particularly to the drawings in which similar reference characters denote similar elements throughout the several views:

FIGURE 1 is a diagrammatic illustration of a system for the separation of gaseous mixtures in accordance with one embodiment of the present invention;

FIGURE 2 is an illustration of a modification of the system of FIGURE 1;

FIGURE 3 is a diagrammatic illustration of a system for the separation of gaseous mixtures in accordance with another embodiment of the present invention; and FIGURE 4 is an illustration of a modification of the system of FIGURE 3.

Referring now to the drawings and more particularly to FIGURE 1, gaseous mixture containing argon as the major component and including oxygen and nitrogen impurities and which may also include small amounts of water vapor and hydrocarbons enters the system through conduit 1 and passes to a compression unit 2 through conduit 3. A stream of hydrogen enters the system through conduit 4 and is passed to the compression unit 2 as by connection of conduit 4 to conduit 1. Compressed gaseous mixture including added hydrogen is passed through conduit 5 to catalytic reactor 6. In catalytic reactor 6 the oxygen of the gaseous mixture reacts with the added hydrogen to form water, and in order to insure that the total oxygen of the gaseous mixture is removed the quantity of hydrogen added is in excess of the stoichiometric amount required for reaction with the total oxygen of the gaseous mixture. Thus, the reaction product of the reactor 6 includes the argon, nitrogen and any incidental impurities of the gaseous mixture as well as moisture initially present and water resulting from the catalytic reaction and the excess hydrogen. The reaction product is passed by a conduit 7 to a cooler 8 and then by conduit 9 to a drier 11 which may be an adsorbent type drier wherein the water is removed from the reaction product. In the cooler 8 the temperature of the reaction product may be reduced to below the condensation temperature of water and thus reduce the required drier capacity.

The reaction product free of water is conducted by conduits 12 and 13 to a second compression unit 14. The further compressed reaction product is conducted by conduit 15 to pass 16 of a three-pass heat exchange device 17 where the reaction product is cooled to a low temperature by countercurrent heat interchange with relatively cold products of a fractionating operation, described below, flowing through passes 21, 22 and 23 of the heat exchange device. The cool reaction product is conducted by conduit 24 to the shell side 25 of a reboiler condenser 26 of a fractionating column 27. The tubes 28 of the reboiler condenser 26 are in communication with the fractionating zone 36 and receive relatively cold high purity liquid argon as described below.

The water-free reaction product in the shell side 25 of reboiler condenser 26 undergoes partial condensation and thus separation by heat interchange with the liquid argon producing a first liquid high boiling point fraction which collects in a pool 29 in the shell space 25 and a first gaseous low boiling point fraction which collects in the shell space 25 above the liquid pool 29. As used herein, the term "fraction" includes the portions of a material obtained from any separation step including separation by partial condensation and is not limited to the portions of a material obtained from separation by fractionation. The first low boiling point fraction contains substantially the total hydrogen of the reaction product and is withdrawn from the reboiler condenser 26 by a conduit 31 and conducted thereby for flow through pass 21 of the heat exchange device 17 in countercurrent heat interchange with the reaction product; the low boiling point fraction leaves the warm end of the heat exchange device 17 at about ambient temperature and is merged by way of conduit 32 with the gaseous mixture in conduit 1 to decrease the hydrogen requirements of the catalytic reaction. The first liquid high boiling point fraction collecting in the pool 29 is substantially free of hydrogen and contains a major portion of the argon and nitrogen of the reaction product.

In accordance with a modification of the system of FIGURE 1, the reboiler condenser 26 is replaced by a high pressure fractionating zone 33 of fractionating column 27 as shown in FIGURE 2 of the drawings. This will be referred to hereinafter as first fractionating zone 33. Apart from the employment of a fractionating zone 33 in lieu of reboiler condenser 26, the system is essentially the same as that shown in FIGURE 1 and it is only necessary to illustrate the bottom portion of fractionation column 27 in FIGURE 2. The first fractionating zone 33 is provided with a suitable vapor-liquid contact means such as bubble-type fractionating trays 34. The first fractionating zone 33 is joined by a condenser 35 to a relatively low pressure fractionating zone 36 of column 27; however, a structurally independent condenser may be employed if desired. This latter fractionating zone will be referred to hereinafter as second fractionating zone 36 or simply fractionating zone 36. The shell side 37 of the condenser is in liquid and vapor communication with the second fractionating zone 36 through conduits 41 and 42, respectively, and the tubes 43 communicate at their lower end with the first fractionating zone 33 and at their upper ends with dome space 44. In fractionating zone 33 as in reboiler condenser 26 the water-free reaction product undergoes partial separation producing a first liquid high boiling point fraction which collects in a pool 45 in the bottom of the first fractionating zone 33 and a first gaseous low boiling point fraction which flows upwardly through the tubes 43 of condenser 35 and collects in the dome space 44. The low boiling point fraction contains substantially all the hydrogen of the reaction product and is withdrawn from the dome space 44 through the conduit 31 and conducted thereby for flow through pass 21 of the heat exchange device 17 and merged by way of conduit 32 with the gaseous mixture in conduit 1 as described above in regard to the low boiling point fraction from the reboiler condenser 26. The first liquid high boiling point fraction collecting in the pool 45 is substantially free of hydrogen and contains a major portion of the argon and nitrogen of the reaction product.

A stream of first liquid high boiling point fraction is withdrawn from either pool 29 or pool 45, depending upon whether a reboiler condenser 26 or a first fractionating zone 33 is employed, through a conduit 46 and, as shown in FIGURE 1, passed through an adsorber 47 that retains any hydrocarbons that may be present in the stream of liquid. The stream of liquid from the adsorber 47 passes through conduit 48 and is expanded in valve 49 to the pressure of fractionating zone 36 of the fractionating column 27. This stream is introduced as feed into the fractionating zone 36 wherein the separation is continued producing a second gaseous low boiling point fraction withdrawn through conduit 51 in the upper end of the fractionating zone 36, and a second liquid high boiling point fraction consisting of high purity argon collecting in a pool 52 at the bottom of fractionating zone 36 as per FIGURE 1 or in a pool 53 in the shell space 37 of the condenser 35 as per FIGURE 2. Fractionating zone 36 is provided with liquid-vapor contact means such as trays 54 and with a condenser 55 at tis upper end.

In the embodiment of FIGURE 2 the heat interchange between the liquid high boiling point fraction collecting in the pool 53 and the first gaseous low boiling point fraction flowing upwardly through the tubes 43 results in partial liquefaction of the first gaseous low boiling point fraction to provide reflux for the first fractionating zone 33. Reflux for the fractionating zone 36 is obtained by partial liquefaction of the second low boiling point fraction in the top of zone 36 upon the evaporation of a liquefied gaseous material. Liquefied gaseous material, such as liquid nitrogen, is fed to the shell side 56 of condenser 55 to effect the partial liquefaction of the second gaseous low boiling point fraction flowing upwardly through tubes 57 of the condenser 55 and thus provide reflux for the fractionating zone 36.

The second gaseous low boiling point fraction is merged by way of conduit 62 with the first low boiling point fraction from the condenser reboiler 26 or first fractionating zone 33 as the case may be, in conduit 31 and thus is conducted through pass 21 of the heat interchange device 17 in countercurrent heat exchange with the reaction product and merged by way of conduit 32 with the gaseous mixture in conduit 1 to recover the argon retained in the second gaseous low boiling point fraction. All of the second low boiling point fraction may be recycled through conduit 62 or a portion of it may be passed to the atmosphere through conduit 61.

In order to control the reflux ratio in the lower portion of the fractionating zone 36 a stream of gas is withdrawn from an intermediate point of the fractioning zone through conduit 63 and conducted thereby through the pass 23 of the heat exchange device 17 in countercurrent heat interchange with the reaction product. The withdrawn gas leaves the warm end of the heat exchange device 17 and is merged by way of conduit 64 with the water-free product in conduit 13.

In order to permit recycling of the gas withdrawn from an intermediate point without the necessity of merging the withdrawn gas on the downstream side of compression unit 2 whereby the gas would be unnecessarily recycled through the reactor 6, cooler 8 and drier 11, it is preferred to employ two compression units 2 and 14 as shown in the drawings. Compression unit 2 compresses the gaseous mixture entering through conduit 1 to a pressure substantially equivalent to the pressure of the gas withdrawn from an intermediate point of the fractionating zone in conduit 64 plus the pressure drop through reactor 6, cooler 8 and drier 11. The composite of water-free reaction product and the gas from conduit 64 is then compressed in compression unit 14 to a pressure equivalent to the pressure at the feed point in fractionating zone 36 plus the pressure drop through heat exchanger 17, hydrogen separation in reboiler condenser 26 or fractionating zone 33 and adsorber 47.

The second low boiling point fraction recycled through conduits 62 may be merged with the gas in conduit 63 rather than with the first low boiling point fraction in conduit 31. This alternative arrangement is illustrated in FIGURE 3 and while FIGURE 3 illustrates a different embodiment of the invention, it is to be understood that the second low boiling point fraction may be mixed with either the first low boiling point fraction or with the gas withdrawn through conduit 63 in either embodiment of the invention.

The second high boiling point fraction, i.e., the high purity argon, is withdrawn in the gaseous phase from above the liquid pool 52 in FIGURE 1 or from above the dome space 44 of FIGURE 2 through conduit 65 for flow through the pass 22 of the heat exchange device 17 in countercurrent heat interchange with the reaction product. The second high boiling point fraction leaves the warm end of the heat exchange device 17 through conduit 66 at substantially ambient temperature and comprises the high purity argon product of the system.

While a system for separating argon containing gaseous mixtures to produce high purity argon has been described, the method of this invention may also be applied to the low temperature separation of argon containing liquid mixtures of materials that are gaseous at normal temperature and pressure by modification of the system as shown in phantom in FIGURE 1. According to this modification a liquid mixture containing argon as the major component and including oxygen and nitrogen impurities and which may also include small amounts of water vapor and hydrocarbons enters the system through conduit 67 in lieu of gaseous mixture entering the system through conduit 1. The liquid mixture is vaporized by passage through pass 68 of a vaporizer exchange 69 where the liquid mixture is vaporized by countercurrent heat interchange with a portion of the reaction product flowing through pass 71. This portion of the water-free reaction product is conducted to pass 71 through conduit 72, leaves through conduit 73 and is merged in conduit 24 with the portion of the water-free reaction product which passes through conduit 15, pass 16 and conduit 24. Since the portion of the water-free reaction product which passes through pass 71 is cooled by heat exchange with the vaporizing liquid mixture in pass 68 it does not require cooling in exchanger 17. Accordingly, it is merged in conduit 24 with the portion of the water-free reaction product from heat exchanger 17 and passed through conduit 24 to reboiler condenser 26.

The vaporized liquid mixture from pass 68 is conducted through conduit 74 and merged in conduit 3 with the hydrogen passing through conduit 4 and with the mixture of the first and second low boiling point fractions passed by conduit 32 to conduit 1. This gaseous mixture is compressed and processed according to the method of this invention as described above. However, instead of withdrawing gaseous second high boiling point fraction, i.e., the high purity argon, from above the pool 52 through conduit 65, the second liquid high boiling point fraction may be withdrawn through conduit 75 in liquid phase. In addition to the above, a liquid argon containing mixture may be processed to produce high purity gaseous argon and conversely a gaseous mixture may be processed to produce high purity liquid argon in accordance with the principles of this invention.

The liquefied gaseous material, such as liquid nitrogen, fed to the shell side 56 of condenser 55 is obtained from a closed refrigeration cycle. As shown in FIGURE 1, dry nitrogen gas compressed to a relatively high pressure in a compressor 76 is conducted through a conduit 77 to pass 81 of a heat exchange device 82 where it is cooled by countercurrent heat interchange with relatively cold gaseous nitrogen flowing through pass 83 of the heat exchange device. At an intermediate point of the heat exchange device 82, the high pressure nitrogen stream is withdrawn and passed by conduit 84 to a heat exchange device 85 for heat interchange with a source of external refrigeration. The nitrogen flows from the heat exchange device 85 through conduit 86 connected to pass 87 of the heat exchange device 82 and leaves the cold end of the latter heat exchange device through conduit 88. The cooled nitrogen is expanded in valve 89 to a relatively low pressure and partially liquefied thereby and then introduced through conduit 91 into the shell space 56 of the condenser 55 to form a liquid pool 92. The liquefied nitrogen is vaporized in condenser 55 and gaseous nitrogen is withdrawn from the condenser through conduit 93 and conducted to the pass 83 of the heat exchange device 82. From the warm end of the latter heat exchange device, the gaseous nitrogen is conducted through conduit 94 to the inlet of the compressor 76.

In accordance with another embodiment of this invention, the first separation step may be carried out in a separate condenser 95 as shown in FIGURE 3, in lieu of reboiler condenser 26. The method steps in accordance with the system shown in FIGURE 3 up to the first separation step are the same as the system shown in FIGURE 1 and accordingly will not be described. In the system shown in FIGURE 3, the cooled reaction product is conducted to condenser 95 through conduit 24. Liquefied gaseous material, such as liquid nitrogen, is fed to the shell side 96 of condenser 95 to effect partial condensation of the reaction product flowing upwardly through tubes 97 of the condenser 95 thus effecting separation producing a first liquid high boiling point fraction which collects in a pool 101 at the bottom of the condenser 95 and a first gaseous low boiling point fraction which collects in the dome space 102. As in the previous embodiment, the low boiling point fraction contains substantially the total hydrogen of the reaction product and is withdrawn from the dome space 102 through conduit 31 and conducted thereby for flow through the pass 21 of the heat exchange device 17, and merged by way of conduit 32 with the gaseous mixture in conduit 1.

The first liquid high boiling point fraction collecting in the pool 101 is substantially free of hydrogen and contains a major portion of the argon and nitrogen.

In a modification of the system of FIGURE 3, a fractionation column or zone, referred to hereinafter as first fractionation zone 103, may be substituted for condenser 95 as shown in FIGURE 4 to obtain improved separation of the first gaseous low boiling point fraction from the first liquid high boiling point fraction. Apart from the employment of a fractionating zone 103 in lieu of condenser 95, the system is essentially the same as that shown in FIGURE 3 and it is only necessary to illustrate the first fractionating zone 103 in FIGURE 4. The first fractionating zone 103 is provided with suitable vapor-liquid contact means, such as bubble-type fractionating trays 104. A condenser 105 is provided in the top of fractionating zone 103 having tubes 106 which communicate with the fractionating zone 103.

The water-free reaction product undergoes separation in the fractionating zone 103 producing a first liquid high boiling point fraction which collects in a pool 107 in the bottom of the first fractionating zone 103 and a first gaseous low boiling point fraction which flows upwardly through the tubes 106 of the condenser 105 and collects in the dome space 108. Liquefied gaseous material, preferably liquid nitrogen, is fed to the shell side 109 of condenser 105 to effect partial condensation of the first gaseous low boiling point fraction flowing upwardly through tubes 106 and thus provides reflux for the fractionating zone 103. The low boiling point fraction is withdrawn from the dome space 108 by conduit 31 for flow through pass 21 and merging by way of conduit 32 with the gaseous mixture of conduit 1.

The stream of first liquid high boiling point fraction is withdrawn from the pool 101 or 107 and passed through conduit 46 and adsorber 47 which retains any hydrocarbon impurities which may be present in the first high boiling point liquid fraction and is then fed through conduit 48 into fractionating zone 36 at an intermediate point.

The operation of fractionating column 27 and particularly zone 36 is the same as in the embodiment of the invention shown in FIGURE 1 and described above and accordingly need not be further described. The only difference between the operation of fractionating zone 36 according to the embodiments of FIGURES 3 and 4 and the embodiments of FIGURES 1 and 2 lies in the fact that the second liquid high boiling point fraction which consists of high purity argon is reboiled in reboiler 26 in heat exchange with condensing gaseous material such as nitrogen in the shell side 25 rather than by heat exchange with condensing reaction product. As in the case of the embodiments of FIGURES 1 and 2, the second gaseous low boiling point fraction is recycled through conduit 62 and a portion may be vented through conduit 61. The recycle portion may be intermixed with the vapor withdrawn from an intermediate point of the fractionating zone 36 through conduit 63 as shown in FIGURE 3 or with the first gaseous low boiling point fraction in conduit 31 as shown in FIGURE 1.

The liquid nitrogen fed to the condensers 55 and 95 or 105 is obtained from a closed refrigeration system in which part of the required refrigeration is obtained by the partial vaporization of the second liquid high boiling point fraction in the reboiler-condenser 26.

As shown, dry nitrogen gas compressed to a relatively high pressure in compressor 111 is conducted through a conduit 112 to pass 113 of a heat exchange device 114 where it is cooled by countercurrent heat interchange with relatively cold gaseous nitrogen flowing through passes 115 and 116 of the heat exchange device. The cooled nitrogen is expanded in expansion engine 117 to a relatively low intermediate pressure, and the expanded nitrogen partly in liquid phase is introduced by conduit 118 into the shell side 25 of the reboiler-condenser 26 where the nitrogen is totally liquefied upon vaporization of the second high boiling point fraction to form a pool 119. Liquid nitrogen is withdrawn from the reboiler-condenser 26 through conduit 120 and divided into two streams. The first stream flows through conduit 121 and is subcooled upon flowing through pass 122 of heat exchange device 123 in countercurrent heat interchange with relatively cold gaseous nitrogen flowing through pass 124, flows through conduit 125 and is expanded in valve 126 to a relatively low pressure and then introduced into the shell space 96 of condenser 95 or the shell space 109 of condenser 105. The liquid nitrogen is vaporized in the condenser 95 or 105 and gaseous nitrogen is then withdrawn from the condenser through conduit 128 and conducted to the pass 124 of heat exchange device 123. From the warm end of the latter heat exchange device, the gaseous nitrogen is conducted through conduit 129 for flow through the pass 115 of the heat exchange device 114 and from the latter heat exchange device is conducted by conduit 130 to the inlet of the compressor 111.

The second portion of the liquid nitrogen from the reboiler-condenser 26 is passed through conduit 131, subcooled upon flowing through pass 132 of heat exchange device 133 in countercurrent heat interchange with relatively cold gaseous nitrogen flowing through pass 134, passed through conduit 135 and expanded in valve 136 to a lower pressure than that of the first stream after expansion in valve 126 and then introduced into the shell space 56 of the condenser 55. The liquid nitrogen is vaporized in the condenser 55 and gaseous nitrogen is withdrawn from the condenser through conduit 137 and conducted to the pass 134 of the heat exchange device 133. From the warm end of the latter heat exchange device the gaseous nitrogen is conducted through conduit 138 for flow through the pass 116 of the heat exchange device 114 and from the latter heat exchange device is conducted by conduit 139 to the inlet of a second nitrogen compressor 140. Since the pressure of the nitrogen from the condenser 55 is lower than that from condenser 95 or 105 the nitrogen from condenser 55, i.e., the second stream of nitrogen, is compressed in compressor 140 to the pressure of the stream of nitrogen from condenser 95 or 105, i.e., the first stream of nitrogen, passed through conduit 141 and merged with the first stream of nitrogen in conduit 130 wherein the mixture of the two streams is conducted to the compressor 111.

The following data is typical of conditions existing in the system of FIGURE 1 operating in accordance with the present invention. Gaseous mixture entering through conduit 1 contains on the basis of 100 s.c.f.m. about 225 p.p.m. of nitrogen, about 50 p.p.m. of oxygen, about 50 p.p.m. of water vapor and less than about 5 p.p.m. of other impurities principally hydrocarbons and the balance argon. The abbreviation "s.c.f.m." as used herein represents standard cubic feet per minute, while the abbreviation "p.p.m." as used herein represents parts per million by weight. The gaseous mixture enters at 75° F. and is merged with about 10 s.c.f.m. of the two low boiling point fractions in conduit 32 containing about 5% nitrogen and about 18% hydrogen by volume and the balance argon. Hydrogen at a temperature of about 70° F. is added to this mixture through line 4 in an amount sufficient to provide an excess of approximately 1% hydrogen in the reaction product from the catalytic reactor 6. This mixture is compressed from a pressure of 14.5 p.s.i.a. to 20 p.s.i.a. at a temperature of about 90° F. by compression unit 2 which may be of any suitable type. The catalytic reactor 6 may comprise a container filled with a platinum-palladium catalyst and the reaction product contains less than 1 p.p.m. of oxygen. The temperature of the gaseous reaction product leaving the catalytic reactor is about 525° F. The reaction product is cooled in cooler 8 to below the condensation temperature of water. The water is removed from the reaction product in drier 11 which may consist of a pressure type steel cylinder packed with an alumina adsorbent. The dried reaction product is merged with 115 s.c.f.m. of the gas in conduit 64 which was withdrawn from an intermediate point of the fractionating zone 36. The overall mixture containing about 2% nitrogen, 1% hydrogen and the balance substantially all argon is compressed from a pressure of 18 p.s.i.a. to 48 p.s.i.a. by compressor 14 which may be of any suitable type. The compressed mixture enters the heat exchanger 17 at a rate of about 225 s.c.f.m., and a temperature of about 76° F., wherein it is cooled to about −290° F. and enters the reboiler-condenser 26 at about 44 p.s.i.a. The first low boiling point gaseous fraction withdrawn from the shell side 25 of reboiler-condenser 26 above pool 29 comprises about 20% hydrogen, 4% nitrogen, and the balance argon. The stream is withdrawn at a rate of about 9 s.c.f.m. The second low boiling point fraction leaves the top of column 27 at a temperature of about −307° F. and a pressure of about 18 p.s.i.a., flows through conduit 62 at a rate of about 1 s.c.f.m. and comprises about 15% nitrogen, 85% argon, and is merged with the first low boiling point fraction in conduit 31. This is practically all the second low boiling point fraction since only a very small amount, i.e., about 0.14 s.c.f.m., is vented through conduit 61. The mixture of the two low boiling point fractions leaves the warm end of the heat exchange device 17 at a temperature of about 70° F.

The first liquid high boiling point fraction is withdrawn from the pool 29 of the reboiler-condenser 26 at a rate of about 216 s.c.f.m. and flows through adsorber 47. The adsorber 47 comprises a steel cylinder filled with silica gel adsorbent. The first liquid high boiling point fraction from adsorber 47 containing 2% nitrogen and the balance argon is expanded in valve 49 to a pressure of about 20 p.s.i.a. and is further cooled to a temperature of about −300° F.

The gaseous stream withdrawn from an intermediate point of the fractionating zone 36 comprising about 3% nitrogen and 97% argon passes through conduit 63 to heat exchanger 17 at a rate of 115 s.c.f.m. under a pressure of about 20 p.s.i.a. and a temperature of about −300° F. and is heated in heat exchanger 17 to about 70° F. The reflux ratio in the fractionating zone 40 below the withdrawal point is approximately 2:1, i.e., 200 s.c.f.m. passing downward and 100 s.c.f.m. passing upward. Approximately 16 s.c.f.m. pass upward from the withdrawal point in column 35 and about 15 s.c.f.m. pass downward to the withdrawal point.

Substantially pure gaseous argon containing less than 50 p.p.m. of impurities flows from above the pool 52 in the bottom of the fractionating zone 36 through conduit 65 at a rate of 100 s.c.f.m., a pressure of 22 p.s.i.a. and a temperature of about −295° F., is heated to about 70° F. upon flow through heat exchange device 17 and leaves the system through conduit 66 at substantially that temperature and under a pressure of about 15 p.s.i.a.

With regard to the nitrogen refrigeration cycle about 322 standard cubic inches per hour of dry nitrogen gas is compressed to about 3,000 p.s.i.a. in the compressor 76, the temperature of the gaseous nitrogen leaving the compressor being about 85° F. The compressed nitrogen leaving the pass 81 of the heat exchange device 82 at about −25° F. is cooled to about −58° F. in the heat exchange device 85 and leaves the cold end of the heat exchange device 82 at about −200° F. The cooled compressed nitrogen is expanded in valve 89 to a pressure of about 20 p.s.i.a. with cooling to a temperature of about −315° F. The evaporated nitrogen leaving condenser 55 is under a pressure of about 20 p.s.i.a. and a temperature of about −315° F. and is warmed in heat exchange device 82 to a temperature of about 80° F.

The following data is typical of conditions existing in the system of FIGURE 3 operating in accordance with this invention. Gaseous mixture entering through conduit 1 contains, on the basis of 100 s.c.f.m., about 225 p.p.m. of nitrogen, 50 p.p.m. of oxygen, 50 p.p.m. of water vapor, and less than 5 p.p.m. of other impurities primarily hydrocarbons, the balance argon. This gas enters at 75° F. and is merged with about 8 s.c.f.m. of the first low boiling point fraction containing 4% nitrogen, 20% hydrogen, the balance argon in conduit 32. Hydrogen at a temperature of about 70° F. is added to this mixture through line 4 in an amount sufficient to provide an excess of approximately 1% hydrogen in the reaction product from the catalytic reactor 6. This mixture is compressed from a pressure of 14.5 p.s.i.a to 20 p.s.i.a. at a temperature of about 90° F. by compression unit 2 which may be of any suitable type. The catalytic reactor 6 comprises a container filled with a platinum-palladium catalyst and the reaction product contains less than 1 p.p.m. of oxygen. The temperature of the gaseous reaction product leaving the catalytic reactor is about 525° F. The reaction product is cooled in cooler 8 to below the condensation temperature of water. The water is removed from the reaction product in drier 11 which consists of a pressure type steel cylinder packed with an alumina adsorbent. The dried reaction product is merged with 92 s.c.f.m. of the mixture in conduit 64 of gas withdrawn from the intermediate portion of fractionating zone 36 and the second low boiling point fraction. The overall mixture containing about 2% nitrogen, 1% hydrogen, and the balance substantially all argon is compressed from a pressure of 18 p.s.i.a. to a pressure of 22 p.s.i.a. in compressor 14. The compressed gaseous mixture enters heat exchanger 17 at a rate of about 200 s.c.f.m. and a temperature of about 76° F., is cooled to about −290° F. and enters the condenser 95. The first low boiling point fraction withdrawn from the dome 102 of condenser 95 at a rate of about 8 s.c.f.m. and a pressure of 22 p.s.i.a. comprises about 5% nitrogen, 20% hydrogen, and the balance argon, the stream is withdrawn at a temperature of −300° F. and leaves the warm end of the heat exchange device 7 at a temperature of 70° F. The first liquid high boiling point fraction is withdrawn from the pool 101 of the condenser 95 at a rate of 192 s.c.f.m., comprises about 98% argon and 2% nitrogen and flows through adsorber 47. Adsorber 47 comprises a steel cylinder filled with silica gel adsorbent. The gas from the adsorber flows directly into the fractionating column 27 at a pressure of about 21 p.s.i.a.

The gaseous stream withdrawn from the intermediate point of fractionating zone 36 flows at a rate of 91 s.c.f.m. through conduit 63 and contains about 3% nitrogen, the balance argon. The reflux ratio in the column below the withdrawal point is approximately 2:1, i.e., 200 s.c.f.m. passing downward in the column, and 100 s.c.f.m. passing upward. Approximately 16 s.c.f.m. passes upward from the withdrawal point of column 27 and about 15 s.c.f.m. passes downward to the withdrawal point. The second low boiling point fraction from the top of column 27 comprising about 15% nitrogen, 85% argon, flows through conduits 51 and 62 at a rate of approximately 1 s.c.f.m. A minor portion of this gas is exhausted to the atmosphere through conduit 61 which portion amounts to only about 0.14 s.c.f.m. This low boiling point fraction leaves column 27 at a temperature of about −307° F. and a pressure of about 18 p.s.i.a. flows through conduit 62 and is merged with the gas withdrawn from the intermediate point of column 27 in conduit 63. About 92 s.c.f.m. of the mixture is warmed in heat exchanger 17 to a temperature of 70° F. and merged with reaction product in conduit 13. Substantially pure argon flows from a point above the pool of liquid argon 52 in the bottom of fractionating zone 36 through conduit 65 at a rate of about 100 s.c.f.m., a pressure of about 22 p.s.i.a., a temperature of about −295° F., is heated to about 70° F. upon flow through the heat exchange device 17 and leaves the system through conduit 66 at substantially that temperature and under a pressure of about 15 p.s.i.a. and contains less than 50 p.p.m. of impurities.

With regard to the nitrogen refrigeration cycle, about 260 s.c.f.m. of dry nitrogen gas is compressed to about 220 p.s.i.a. in the compressor 111, the temperature of the gaseous nitrogen leaving the compressor being about 85° F. The compressed nitrogen leaving the pass 113 of the heat exchange device 114 is at about −245° F. The cooled compressed nitrogen is expanded in expansion engine 117 to a pressure of 84 p.s.i.a. and further cooled to a temperature of about −287° F. The expanded nitrogen is totally liquefied in reboiler-condenser 26. The first stream of nitrogen leaving the reboiler 26 enters the heat exchange device 123 at a rate of 196 s.c.f.m. and is subcooled upon flowing through the pass 122 to a temperature of about −299° F. The subcooled nitrogen is expanded across valve 126 to a pressure of about 32 p.s.i.a. with further cooling to a temperature of about −307° F. The evaporated nitrogen leaving condenser 95 is under a pressure of about 32 p.s.i.a. and a temperature of about −307° F., is warmed in heat exchange device 123 to a temperature of about −295° F. and further warmed in heat exchange device 114 to a temperature of 80° F. The second stream of nitrogen leaving reboiler 26 enters heat exchange device 133 at a rate of 64 s.c.f.m. and is subcooled upon flowing through pass 132 to a temperature of about −297° F. The subcooled nitrogen is expanded in valve 136 to a pressure of about 20 p.s.i.a. with cooling to a temperature of about −315° F. The evaporated nitrogen leaving condenser 55 is warmed in heat exchange device 133 to a temperature of about −295° F., further warmed in heat exchange device 114 to a temperature of about 80° F. The warmed nitrogen is compressed in compressor 140 to a pressure of 35 p.s.i.a. and a temperature of about 85° F., merged with the first stream of nitrogen in conduit 13 and the mixture recompressed in compressor 111.

It will be understood that various changes, omissions, and additions may be made to this invention without departing from the spirit and scope thereof, as set forth in the appended claims.

What is claimed is:

1. The method of obtaining high purity argon from a gaseous mixture including argon, oxygen and nitrogen which comprises providing compressed gaseous mixture and a quantity of hydrogen in excess of the stoichiometric amount required for the reaction of the hydrogen with the oxygen of the gaseous mixture to form water, passing the compressed gaseous mixture and hydrogen over a catalyst to promote a catalytic reaction between the oxygen and the hydrogen and provide a reaction product including water, argon, nitrogen and hydrogen, removing water from the reaction product, cooling the water-free reaction product by heat interchange with cold fluids from ensuing separation and fractionating steps, separating the cool reaction product under pressure by partial condensation producing a first liquid high boiling point fraction and a first gaseous low boiling point fraction, the first high boiling point fraction comprising argon and nitrogen and the first low boiling point fraction containing substantially the total hydrogen content of the reaction product, passing the first high boiling point fraction to a fractionating zone under reduced pressure wherein the first high boiling point fraction is separated under reduced pressure to produce second liquid high boiling point fraction and second gaseous low boiling point fraction, the second high boiling point fraction comprising substantially pure argon and the second low boiling point fraction containing substantially the total nitrogen content of the reaction product, the partial condensation of the cool reaction product being carried out by heat interchange between cool reaction product and a first relatively cold liquid material with concomitant vaporization of liquid material to provide first vaporized liquid material, establishing heat interchange between second gaseous low boiling point fraction and a second relatively cold liquid material to provide liquid second low boiling point fraction with concomitant vaporization of liquid material to provide second vaporized liquid material, utilizing liquid second low boiling point fraction as reflux for the fractionating zone, compressing first vaporized liquid material and second vaporized liquid material to provide compressed gaseous material, passing compressed gaseous material in heat interchange with second liquid high boiling point fraction to vaporize second high boiling point fraction and liquefy gaseous material, deriving the first relatively cold liquid material and the second relatively cold liquid material from the liquefied gaseous material, and utilizing vaporized second high boiling point fraction as reflux for the fractionating zone.

2. Method as defined in claim 1 in which first vaporized liquid material and second vaporized liquid material are respectively passed in heat interchange with first relatively cold liquid material under relatively high pressure and second relatively cold liquid material under relatively high pressure before the step of compressing the first vaporized liquid material and the second vaporized liquid material.

3. Method as defined in claim 2 in which the gaseous material comprises nitrogen.

4. Method of separating gaseous mixture including argon, nitrogen and oxygen in which argon is the major component which comprises passing compressed gaseous mixture and a quantity of hydrogen in excess of the stoichiometeric amount required for the reaction of the hydrogen with the oxygen of the gaseous mixture to form water over a catalyst to promote a catalytic reaction between the oxygen and the hydrogen and provide a substantially oxygen-free reaction product including water, removing water from the reaction product, further compressing the water-free reaction product, cooling the further compressed reaction product, separating the cool further compressed reaction product under pressure and relatively low temperature in a fractionating zone to produce a liquid high boiling point fraction comprising substantially pure argon collecting in the bottom of the zone and a gaseous low boiling point fraction including nitrogen collecting in the top of the zone, withdrawing a stream of gas from the fractionating zone at a point of the zone intermediate the top of the zone and the bottom of the zone, passing the withdrawn stream of gas in counter-current heat interchange with the further compressed reaction product on its way to the fractionating zone and thereafter merging the withdrawn stream of gas with the water free reaction product prior to the step of further compressing the reaction product.

5. The method of obtaining high purity argon from a gaseous mixture including argon, oxygen and nitrogen which comprises providing compressed gaseous mixture and a quantity of hydrogen in excess of the stoichiometric amount required for the reaction of the hydrogen with the oxygen of the gaseous mixture to form water, passing the compressed gaseous mixture and hydrogen over a catalyst to promote a catalytic reaction between the oxygen and the hydrogen and provide a reaction product including water, argon, nitrogen and hydrogen, removing water from the reaction product, cooling the water-free reaction product by heat interchange with cold fluids from ensuing separation and fractionating steps, separating the cool reaction product under pressure by partial condensation producing a first liquid high boiling point fraction and a first gaseous low boiling point fraction, the first high boiling point fraction comprising argon and nitrogen and the first low boiling point fraction containing substantially the total hydrogen content of the reaction product, passing the first high boiling point fraction to a fractionating zone under reduced pressure wherein the first high boiling point fraction is separated under reduced pressure to produce second liquid high boiling point fraction and second gaseous low boiling point fraction, the second high boiling point fraction comprising substantially pure argon and the second low boiling point fraction containing substantially the total nitrogen content of the reaction product, a source of extraneous gaseous material, passing gaseous material from said source in heat interchange with second liquid high boiling point fraction to vaporize second liquid high boiling point fraction and provide a body of liquefied extraneous material, utilizing vaporized second high boiling point fraction as reflux for the fractionating zone, the partial condensation of the cool reaction product being carried out by heat interchange between cool reaction product and a first relatively cold liquefied extraneous material withdrawn from the body of liquefied extraneous material, establishing heat interchange between second gaseous low boiling point fraction and a second relatively cold liquefied extraneous material withdrawn from the body of liquefied extraneous material to provide liquid second low boiling point fraction, and utilizing liquid second low boiling point fraction as reflux for the fractionating zone.

References Cited by the Examiner
UNITED STATES PATENTS

| | | | |
|---|---|---|---|
| 1,609,450 | 12/26 | Van Nuys | 62—27 |
| 2,334,632 | 11/43 | Koehler | 62—27 |
| 2,417,279 | 3/47 | Van Nuys | 62—27 |
| 2,422,626 | 6/47 | Koehler | 62—27 |
| 2,601,077 | 6/52 | Wylie | 62—25 |
| 2,817,215 | 12/57 | Sixsmith | 62—33 |
| 2,874,030 | 2/59 | Dennis | 23—209 |
| 2,909,410 | 10/59 | Fedorko | 62—22 X |
| 2,990,689 | 7/61 | Lorenz | 62—22 |
| 2,990,690 | 7/61 | Martin | 62—22 |
| 2,993,342 | 7/61 | Koble | 62—22 |
| 3,062,016 | 11/62 | Dennis | 62—22 |

FOREIGN PATENTS 577,729   6/59   Canada.

OTHER REFERENCES

"Argon, Helium and the Rare Gases," volume II, Cook, 1961, Interscience Publishers, New York, pages 421–3.

NORMAN YUDKOFF, *Primary Examiner.*

ROBERT A. O'LEARY, MAURICE A. BRINDISI,
*Examiners.*

UNITED STATES PATENT OFFICE
CERTIFICATE OF CORRECTION

Patent No. 3,181,306                            May 4, 1965

Jacob M. Geist et al.

It is hereby certified that error appears in the above numbered patent requiring correction and that the said Letters Patent should read as corrected below.

Column 3, line 52, for "tis" read -- its --; column 4, line 13, for "water-free product" read -- water-free reaction product --; line 64, for "exchange" read -- exchanger --; column 8, line 54, for "comprissed" read -- compressed --.

Signed and sealed this 28th day of September 1965.

(SEAL)
Attest:

ERNEST W. SWIDER                                  EDWARD J. BRENNER
Attesting Officer                                       Commissioner of Patents